United States Patent [19]

Masson

[11] 4,368,955

[45] Jan. 18, 1983

[54] VARIABLE-FOCAL-LENGTH OBJECTIVE

[75] Inventor: André Masson, Saint-Heand, France

[73] Assignee: Etablissements Pierre Angenieux, Saint-Heand, France

[21] Appl. No.: 155,480

[22] Filed: Jun. 2, 1980

[30] Foreign Application Priority Data

Jun. 26, 1979 [FR] France ................................ 79 16373

[51] Int. Cl.³ ............................................. G02B 15/16
[52] U.S. Cl. .................................................... 350/427
[58] Field of Search ................................. 350/427, 428

[56] References Cited

U.S. PATENT DOCUMENTS 3,891,304 6/1975 Muszumanski et al. ............. 350/428
4,270,848 6/1981 Angenieux .......................... 350/427

Primary Examiner—John K. Corbin
Assistant Examiner—Scott J. Sugarman
Attorney, Agent, or Firm—Michael J. Striker

[57] ABSTRACT

The variable-focal-length objective for motion-picture cameras and especially color television cameras comprises two movable groups of lens elements placed between two stationary groups of lens elements and capable of displacement so as to produce a variation of the focal distance. In this objective, the two movable groups each take part in the total variation of magnification; each elementary magnification has a minimum and maximum absolute value during the variation, such that the ratio of maximum value to minimum value is higher than 1:1. However, only one of the two movable groups which does not pass through a magnification of unity performs both a magnification function and an additional focusing function. On the other hand, the other movable group which may pass through a position corresponding to a magnification of unity performs only a magnification function.

7 Claims, 6 Drawing Figures

VARIABLE-FOCAL-LENGTH OBJECTIVE

This invention relates to variable-focus objectives comprising several groups of lens elements which are respectively movable and stationary, the characteristics of these groups being such that the displacement of the movable groups in accordance with a predetermined optical law makes it possible to obtain a continuous variation of the focal length of the corresponding objective.

In more exact terms, the invention relates to variable-focus objectives of the most common type, namely those comprising at least four groups of lens elements, viz:
a first group which is stationary when the object is placed at infinity but is displaced along the axis in order to adjust the focusing on objects located at a finite distance;
second and third groups which are movable and permit displacement along the axis in order to vary the magnification produced by these two groups, thus producing a variation in focal length of the system;
a final stationary group having the principal function of producing the image on a suitable scale.

However, the fact that the front group of lens elements is movable in order to adjust the focusing is subject to a certain number of disadvantages. One of the main disadvantages lies in the fact that objectives of this type have a substantial overall length by reason of the range of travel to be provided for said front group of lens elements.

In consequence, the center of gravity of the objective is located at a distance from the camera, which is a disadvantage since it is usually fixed in an overhung position. Provision must accordingly be made for reinforced fixing means.

Furthermore, by reason of the mobility of the first group of lens elements, steps must be taken to ensure that said elements have a relatively large useful diameter since they are moved to a distance away from the pupil. However, the size and diameter of lenses are attended by a certain number of drawbacks including in particular the weight and cost of fabrication of lenses.

The aim of the present invention is therefore to circumvent these disadvantages by maintaining in a fixed position the first group of lens elements of a variable-focus objective of the type recalled in the foregoing and by carrying out adjustment of focusing by additional displacement of one of the two groups which take part in the variation of magnification.

To this end, the invention is directed to a variable-focal-length objective consisting of two groups of movable lens elements which are capable of displacement along the axis and placed between a group of stationary lens elements at the front end and another group of stationary lens elements at the rear end. An essential feature of the invention lies in the fact that one of the two groups of movable lens elements does not pass through a magnification of unity and performs both a function of variation of magnification and an additional focusing function whilst the other group of movable lens elements which can pass through a position corresponding to a magnification of unity performs solely a function of variation of magnification.

This particular feature makes it possible to solve one of the most difficult problems presented by an objective of this type. In fact, if a movable group which passes through a magnification of unity were employed for performing the additional focusing function, the displacements of said movable group would in that case be excessive with respect to the dimensions of the objective itself. The objective in accordance with the invention overcomes this disadvantage by virtue of the fact that the additional focusing function is assigned to a movable group which does not pass through a magnification of unity.

The design concept of the objective under consideration is such as to provide a certain number of advantages over the variable-focus objectives at present in use.

Thus, irrespective of the focusing distance, the fixity of the first group of lens elements of said objective results in a reduction in diameter of the lens elements of this group by approximately 20%.

In point of fact, this reduction in dimensions secures the following advantages:
higher relative precision of the active surfaces of the lenses as a result of reduction of deformations under the action of gravity and arising from contact of said lenses with the mechanical support components;
reduction of the weight of the objective, thus making it easier to fix the objective on a motion-picture camera;
the center of gravity of the objective is brought nearer to the camera, thus making it easier to balance the objective-camera assembly and permitting greater mobility of the assembly.

Furthermore, the fact that an additional displacement is applied for the purpose of focusing to a group which is already movable makes it possible to dispense with all the guiding means at the level of the front group which is then completely stationary.

In addition, the volume of the objective remains constant irrespective of the focusing distance, thereby limiting gaseous exchanges between the interior and the exterior of the objective while thus reducing any danger of condensation of steam.

In an advantageous embodiment:
the movable group which takes part solely in the variation of magnification is the group located nearest the stationary element on the object side, said movable group being divergent;
whilst the other movable group which ensures part of the variation of magnification and permits focusing is divergent.

Moreover, the different components of the objective under consideration comply with a certain number of predetermined conditions which make it possible to obtain a satisfactory objective, the function of these conditions being explained in detail hereinafter.

Thus:
the absolute value of the focal distance $f_1$ of the first stationary group is within the range of one-half to double the sum of absolute values of the focal distances $f_2$ and $f_3$ of the two movable groups $$0.5(|f_2|+|f_3|)<|f_1|<2(|f_2|+|f_3|)$$

the absolute value of the focal distance $f_3$ of the second movable group is within the range of one to three times the absolute value of the focal distance $f_2$ of the first movable group $$|f_2|<|f_3|<3|f_2|.$$

Furthermore, the first movable group satisfies the following conditions:
the group comprises in sequence three divergent lenses and one convergent lens;
the refractive index of these four lenses at a wavelength $\lambda = 588$ nm is within the range of 1.60 to 1.85

$$1.60 < n_d < 1.85$$

and the Abbe number $\nu$ of the convergent lens is within the range of 20 to 35

$$20 < \nu_d < 35$$

the absolute value of the radius of curvature of the convergent lens located nearest the preceding divergent lens is within the range of one-half to double the absolute value of the focal distance $f_2$ of said movable group $$0.5|f_2| < |R| < 2|f_2|$$

the absolute value of the radius of curvature R nearest the object of the first divergent lens is comprised between the absolute value of the focal distance $f_2$ of said movable group and four times its absolute value $$|f_2| < |R| < 4|f_2|$$

In regard to the second movable group, this latter satisfies the following conditions:
said group comprises in sequence two divergent lenses and one convergent lens;
the refractive index of these three lenses at a wavelength $\lambda = 588$ nm is within the range of 1.60 to 1.85

$$1.60 < n_d < 1.85$$

and the Abbe number $\nu$ of the convergent lens is within the range of 20 to 35

$$20 < \nu_d < 35$$

the absolute value of the radius of curvature of the convergent lens nearest the preceding divergent lens is within the range of one-half to double the absolute value of the focal distance $f_3$ of said movable group $$0.5|f_3| < |R| < 2|f_3|$$

the absolute value of the radius of curvature nearest the object of the first divergent lens is within the range of one-half to double the absolute value of the focal distance $f_3$ of said movable group $$0.5|f_3| < |R| < 2|f_3|.$$

Finally, the first convergent stationary group preferably comprises in sequence two divergent lenses, one convergent lens, a cemented doublet consisting of a divergent lens and a convergent lens, and two convergent lenses:
the absolute value of the radius of cementing of the doublet is within the range of one-half to three times the absolute value of the focal distance of said stationary group $$0.5|f_1| < R| < 3|f_1|$$

the absolute value of the radius of curvature nearest the object of the first divergent lens is within the range of one-half to three times the absolute value of the focal distance of said stationary group $$0.5|f_1| < |R| < 3|f_1|$$

One example of construction of a variable-focal-length objective in accordance with the invention is described hereinafter with reference to the accompanying drawings which are given by way of indication and in which.

Figure 1A:
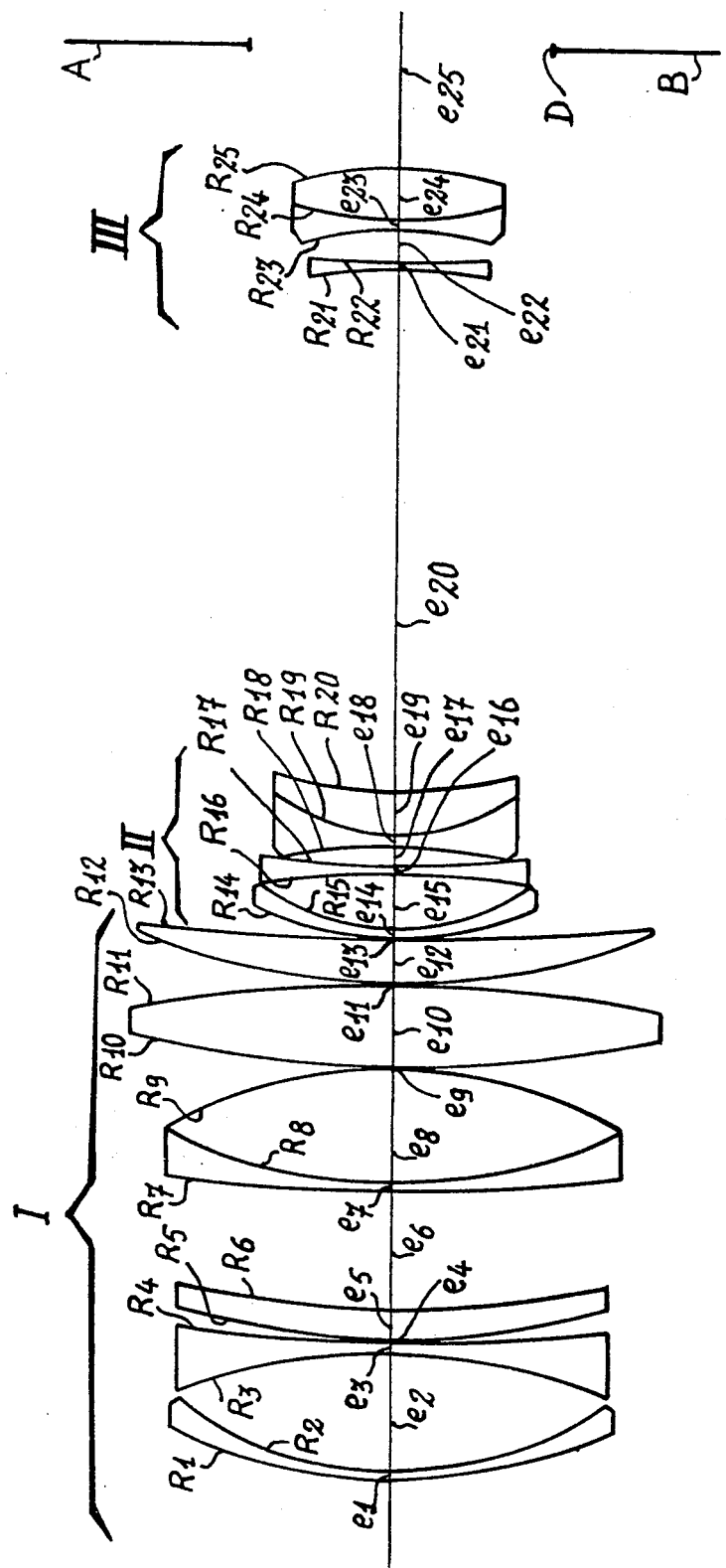
FIGS. 1A and 1B are the two complementary portions of an axial sectional view of the different groups of lens elements of the objective under consideration, these two portions being joined together along the line A-B which passes through the plane of the diaphragm of said objective.
Figure 1B:
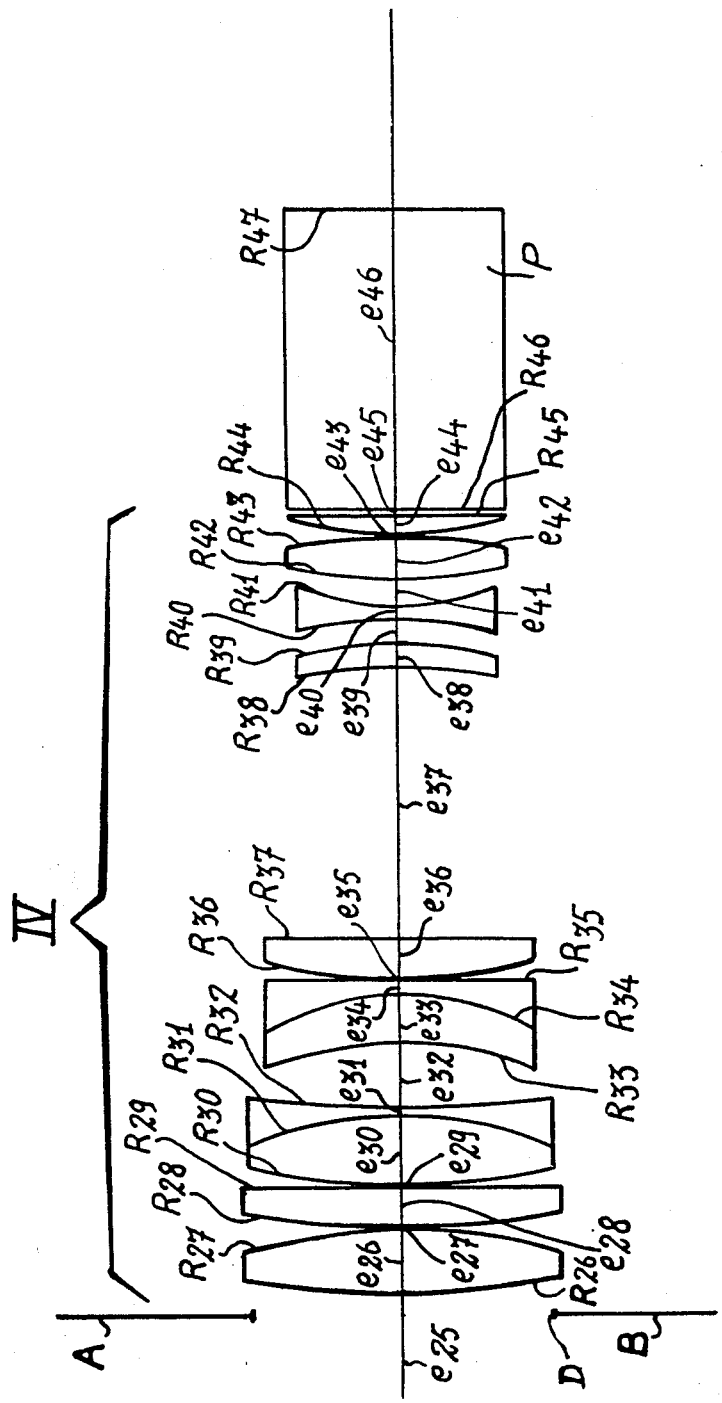
Figure 2A:
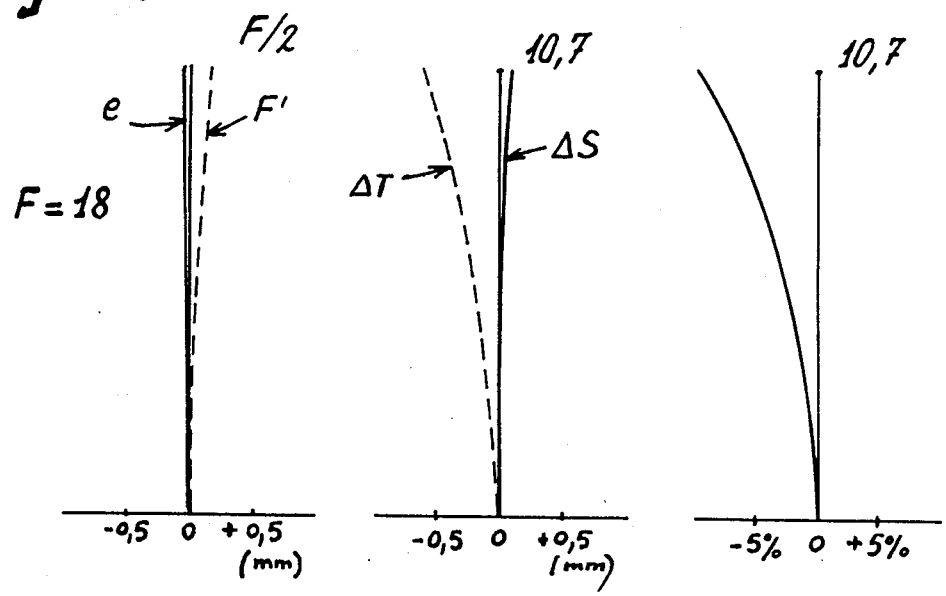
FIGS. 2A to 2D show the curves of spherical aberration, the curves of field curvature and of distortion in respect of four positions of the movable groups corresponding to overall focal distances of the objective of 18, 50, 120 and 270 mm.
Figure 2B:
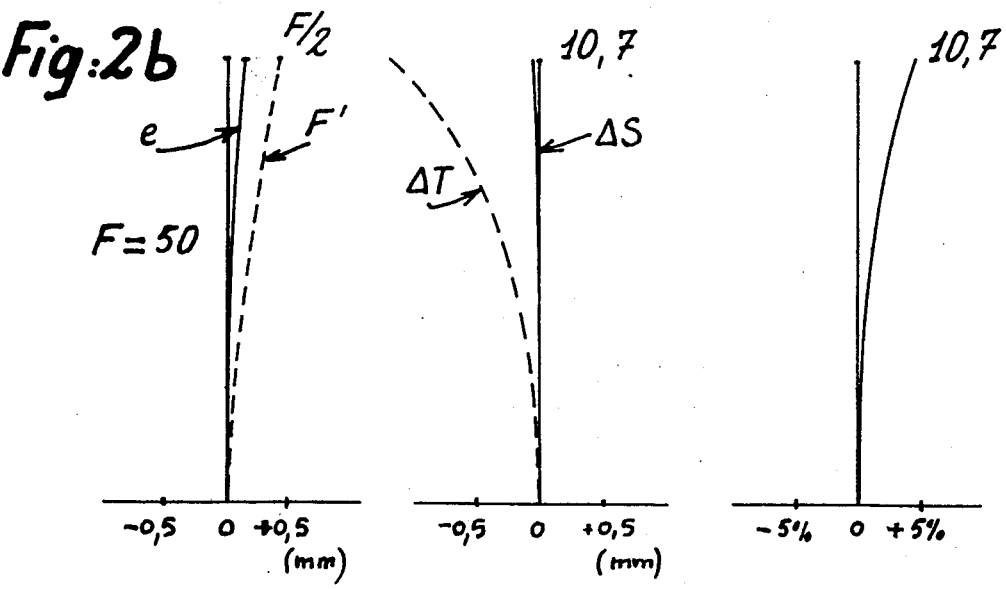
Figure 2C:
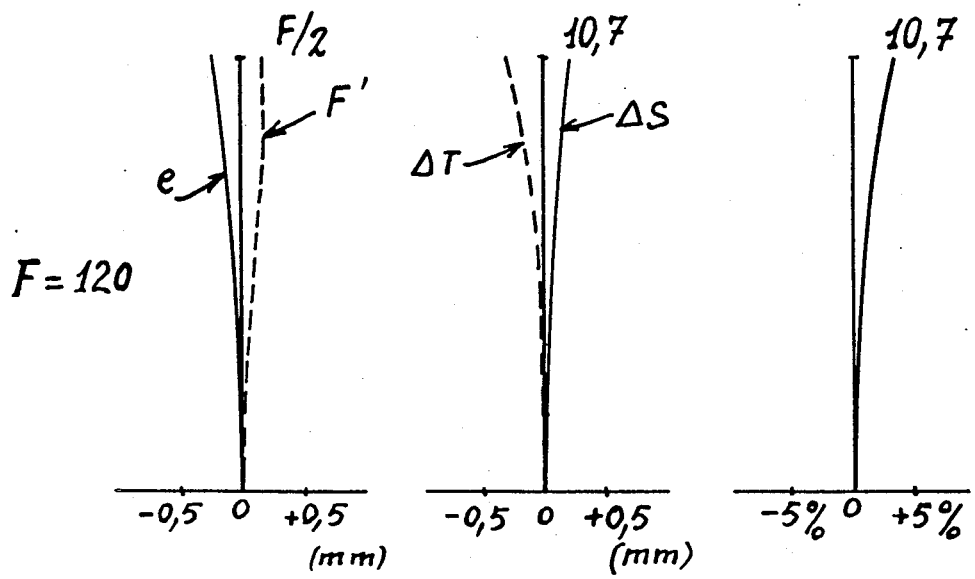
Figure 2D:
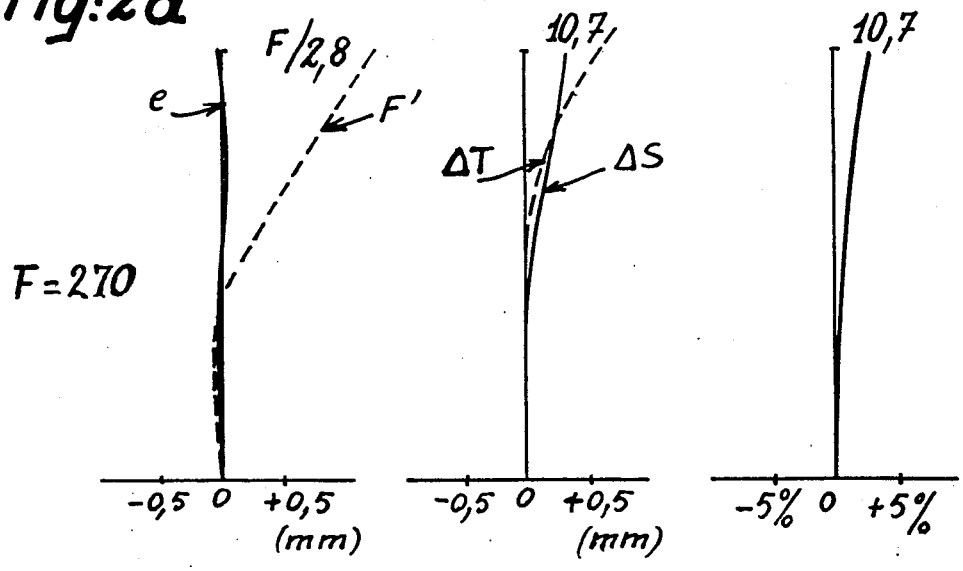

Below air spacings values e13, e20, e25 in the proposed example, in relationship with the four focal distances values F=18, F=50, F=120, and F=270, for which residual aberration curves are given.

|  | F = 18 | F = 50 | F = 120 | F = 270 |
|---|---|---|---|---|
| e13 | 0.288 mm | 61.951 mm | 96.069 mm | 113.520 mm |
| e20 | 114.323 mm | 47.646 mm | 18.800 mm | 29.742 mm |
| e25 | 30.000 mm | 35.014 mm | 29.742 mm | 6.550 mm |

The above values correspond to focussing at infinity.

The objective illustrated in the drawings comprises four groups of lens elements, namely two movable groups II and III placed between two stationary groups I and IV.

The three first groups I, II and III are placed in front of the diaphragm D whilst the fourth group IV is placed behind said diaphragm. This fourth and last group is stationary and has the function of forming an image having the desired size at a given distance which is relatively substantial with respect to the overall focal distance in order to make provision for a beam-splitting prism for spectral analysis of light in the particular application of camera shooting for color television and in order to perform corrections for aberrations introduced by the preceding groups. It should be noted in this connection that the fixity of this group and its arrangement behind the diaphragm constitute a particularly advantageous solution. In fact, this combination makes it possible to ensure fixity of the exit pupil of the objective, which is advantageous when the image produced by the objective is processed by another optical system such as a beam-splitting prism P or an optical relay, for example.

Of the two movable groups II and III, the group which is placed in front, namely group II, has the sole function of variation of the focal length of the objective. This group, however, is intended to pass through a magnification of unity.

On the other hand, the design concept of the system is such that the second movable group III does not pass at all through a magnification of unity. In accordance with the invention, this group possesses both a function of variation in focal length of the objective and an additional function of focusing of the system.

Finally, the stationary front group I has the intended function of producing a real image of the object which is variable both in position and in magnification according to the position of the object 1.

The first group I, which is stationary, comprises seven lens elements, namely a divergent meniscus lens whose convex face is directed towards the object, a biconcave divergent lens, a convergent meniscus lens, a cemented doublet constituted by a divergent lens and a biconvex convergent lens, a biconvex convergent lens and a convergent meniscus lens whose convex face is directed towards the object.

In regard to the first movable group II, this group is made up of four lens elements, namely a divergent meniscus lens whose convex face is directed towards the object, a divergent lens, a doublet constituted by a biconcave divergent lens and a convergent lens.

So far as the second movable group III is concerned, this group is made up of three lens elements, namely a biconcave divergent lens, a doublet constituted by a biconcave divergent lens and a biconvex convergent lens.

Finally, the fourth group, which is stationary, can comprise eleven lens elements, namely two biconcave convergent lenses, a doublet constituted by a biconvex convergent lens and a divergent lens, a doublet constituted by a convergent lens and a divergent lens, a convergent lens, a convergent meniscus lens, a biconcave divergent lens, and two convergent lenses.

The table given hereinafter will in any case specify the values of the different radii of curvature of the lenses of these different groups as well as the values of the air spaces and thicknesses of lenses. The references R1, R2 and R3 designate the radii of curvature of the lenses and are followed by the + sign when their convex faces are directed towards the front and by the − sign in the contrary case. However, this table also indicates the other applied characteristics of the lenses Thus the reference $n_d$ indicates the refractive index relating to each lens in respect of the spectral line d ($\lambda = 588$ nm) whilst the reference $v_d$ designates the value of the Abbe number.

TABLE

| | R | | | E | $n_d$ | $v_d$ |
|---|---|---|---|---|---|---|
| I | R1 | + | 122.41 | | | |
| | R2 | + | 93.16 | e1 2.49 | 1.68900 | 49.6 |
| | | | | e2 25 | air | |
| | R3 | − | 137.53 | | | |
| | R4 | + | 395.18 | e3 2.088 | 1.68900 | 49.6 |
| | | | | e4 0.5 | air | |
| | R5 | + | 163.70 | | | |
| | R6 | + | 247.13 | e5 7 | 1.80000 | 45.6 |
| | | | | e6 26 | air | |
| | R7 | + | 488.60 | | | |
| | R8 | + | 158.05 | e7 1.945 | 1.80510 | 25.5 |
| | R9 | − | 139.46 | e8 25 | 1.48725 | 70.4 |
| | | | | e9 0.156 | air | |
| | R10 | + | 282.29 | | | |
| | R11 | − | 362.36 | e10 18 | 1.64050 | 60.1 |
| | | | | e11 0.078 | air | |
| | R12 | + | 140.62 | | | |
| | R13 | + | 560.32 | e12 11 | 1.64050 | 60.1 |
| | | | | e13 0.288 | air | |

TABLE-continued

| | R | | | E | $n_d$ | $v_d$ |
|---|---|---|---|---|---|---|
| II | R14 | + | 94.63 | | | |
| | R15 | + | 54.52 | e14 2 | 1.80000 | 45.6 |
| | | | | e15 11 | air | |
| | R16 | − | 435.05 | | | |
| | R17 | + | 283.88 | e16 2 | 1.80000 | 45.6 |
| | | | | e17 4 | air | |
| | R18 | − | 127.56 | | | |
| | R19 | + | 44.22 | e18 2 | 1.71300 | 53.8 |
| | R20 | + | 143.80 | e19 10 | 1.78800 | 25.9 |
| | | | | e20 114.323 | air | |
| III | R21 | − | 77.95 | | | |
| | R22 | + | 270.34 | e21 2 | 1.74400 | 44.8 |
| | | | | e22 7 | air | |
| | R23 | − | 61.02 | | | |
| | R24 | + | 76.42 | e23 2 | 1.74400 | 44.8 |
| | R25 | − | 81.91 | e24 12 | 1.78800 | 25.9 |
| | | | | e25 30 | air | |
| IV | R26 | + | 257.07 | | | |
| | R27 | − | 100.76 | e26 15 | 1.68900 | 49.6 |
| | | | | e27 0.5 | air | |
| | R28 | + | 291.24 | | | |
| | R29 | − | 4276.76 | e28 7 | 1.68900 | 49.6 |
| | | | | e29 0.5 | air | |
| | R30 | + | 138.27 | | | |
| | R31 | − | 83.36 | e30 16 | 1.62300 | 58.1 |
| | R32 | + | 430.87 | e31 2.32 | 1.73150 | 28.4 |
| | | | | e32 14 | air | |
| | R33 | − | 98.95 | | | |
| | R34 | − | 64.86 | e33 10 | 1.62040 | 60.3 |
| | R35 | − | 956.80 | e34 2 | 1.73150 | 28.4 |
| | | | | e35 0.20 | air | |
| | R36 | + | 97.47 | | | |
| | R37 | − | 1670.30 | e36 10 | 1.62040 | 60.3 |
| | | | | e37 60 | air | |
| | R38 | − | 100.92 | | | |
| | R39 | − | 64.28 | e38 6 | 1.69900 | 30.1 |
| | | | | e39 5 | air | |
| | R40 | − | 80.25 | | | |
| | R41 | + | 51.18 | e40 2.32 | 1.69600 | 36.5 |
| | | | | e41 5.80 | air | |
| | R42 | + | 80.82 | | | |
| | R43 | − | 89.41 | e42 10 | 1.62040 | 60.3 |
| | | | | e43 0.232 | air | |
| | R44 | + | 78.15 | | | |
| | R45 | + | 5667.83 | e44 4.64 | 1.62000 | 36.3 |
| | | | | e45 1.16 | air | |
| P | R46 | | ∞ | | | |
| | R47 | | ∞ | e46 65.20 | 1.51680 | 64.2 |

On the basis of the values thus established, the focal distances f1, f2 and f3 of the first three groups are respectively as follows: f1 = 131.143, f2 = −45.384 and f3 = −79.526.

In consequence, it can be observed that the objective herein described by way of example fully satisfies the different supplementary conditions which were set forth earlier.

The following inequalities may in fact be noted:
(1) $0.5|f1| - |R1| < 3|f1|$ (2) $0.5|f1| < |R8| < 3|f1|$
(3) $1.60 < nd21\ 1.85$
(4) $20 < v_d < 35$
(5) $|f2| < |R14| < 4|f2|$
(6) $0.5|f2| < |R19| < 2|f2|$
(7) $0.5|f3| < |R21| < 2|f3|$
(8) $0.5|f3| < |R24| < 2|f3|$
(9) $0.5(|f2|+|f3|) < |f1| < 2(|f2|+|f3|)$
(10) $|f2| < |f3| < 3|f2|$ where R1 to R24 define in sequence the radius of curvature of the constituent surfaces of the lens elements of the objective which are numbered from the surface nearest the object.

$n_d$ and $v_d$ represent the refractive indices for the wavelength $\lambda = 588$ nm and the Abbe number of the lens elements constituting the two movable groups.

The respective functions of the different conditions given above are as follows:

Condition (1) is necessary for correcting the distortion when the objective is employed at short focal distances.

Condition (2) is necessary for correcting spherical aberration and chromatic aberration when the objective is employed at long focal distances.

Condition (3) is necessary for correcting the Petzval curvature as well as the residual spherical aberration of the front stationary group.

Condition (4) is necessary for correcting the residual longitudinal chromatic aberration of the front stationary group.

Condition (5) is necessary for correcting the distortion of the objective.

Condition (6) is necessary for correcting the residual spherical aberration of the objective as well as part of the longitudinal chromatic aberration.

Condition (7) is necessary for correcting the residual distortion of the objective.

Condition (8) is necessary for correcting the residual spherical aberration of the objective as well as part of the longitudinal chromatic aberration.

Condition (9) is necessary for fabricating an objective having small overall size and weight.

Condition (10) is necessary for correcting the Petzval curvature throughout the positional variation of the two movable groups.

It should be noted that the objective in accordance with the invention is not limited solely to the embodiment which has been described in the foregoing and which constitutes only an example.

Thus the first movable group can be constituted in a different manner. Instead of comprising in sequence three divergent lenses and one convergent lens, said group could be constituted in sequence by: two divergent lenses, one convergent lens and one divergent lens.

So far as the second movable group is concerned, this group could comprise in sequence one divergent lens, one convergent lens and one divergent lens instead of being constituted by two divergent lenses and one convergent lens.

What is claimed is:

1. A variable-focal-length objective consisting of two movable groups of lens elements which are capable of displacement along the axis and placed between two other stationary groups of lens elements, the displacement of said two movable groups and solely of said two groups being such as to produce a variation of the focal distance and to maintain the image in a fixed plane in respect of any object located at distances chosen at will between finite values and infinity or focusing distance in front of the first stationary group of lenses, wherein:

the two movable groups are divergent and each takes part in the total variation of magnification, each elementary magnification being such as to have a minimum and maximum absolute value during the variation, the ratio of maximum value to minimum value being higher than 1:1;

only one of the two movable groups which does not pass through a magnification of unity performs both a magnification function and an additional focussing function;

the other movable group which may pass through a position corresponding to a magnification of unity performs only a magnification function, said other movable group being nearest the stationary element on the object side;

each movable group comprises at least three lens elements in the case of one group and two lens elements in the case of the other group.

2. A variable-focal-length objective according to claim 1, wherein the respective focal values:
$f_1$ of the first stationary group
$f_2$ of the first movable group
$f_3$ of the second movable group
satisfy the following two conditions:

the absolute value of the focal distance $f_1$ of the first stationary group is within the range of one-half to double the sum of absolute values of the focal distances $f_2$ and $f_3$ of the two movable groups $$0.5(|f_2|+|f_3|) < |f_1| < 2(|f_2|+|f_3|)$$

the absolute value of the focal distance $f_3$ of the second movable group is within the range of one to three times the absolute value of the focal distance $f_2$ of the first movable group $$|f_2| < |f_3| < 3|f_2|$$

3. A variable-focal-length objective according to claim 2, wherein the first movable group satisfies the following conditions:

said first movable group comprises in sequence three divergent lenses and one convergent lens;

the refractive index for the wavelength $\lambda = 588$ nm of the four lenses aforesaid is within the range of 1.60 to 1.85

$$1.60 < n_d < 1.85$$

and the Abbe number $v$ of the convergent lens is within the range of 20 to 35

$$20 < v_d < 35$$

the absolute value of the radius of curvature of the convergent lens which is nearest the preceding divergent lens is within the range of one-half to double the absolute value of the focal distance $f_2$ of said movable group $$0.5|f_2| < |R| < 2|f_2|$$

the absolute value of the radius of curvature R nearest the object of the first divergent lens is comprised between the absolute value of the focal distance $f_2$ of said movable group and four times its absolute value $$|f_2| < |R| < 4|f_2|$$

4. A variable-focal-length objective according to claim 2, wherein the first movable group satisfies the following conditions:
   said first movable group comprises in sequence two divergent lenses, one convergent lens and one divergent lens;
   the refractive index for the wavelength $\lambda = 588$ nm of the four lenses aforesaid is within the range of 1.60 to 1.85

$$1.60 < n_d < 1.85$$

and the Abbe number $\nu$ of the convergent lens is within the range of 20 to 35

$$20 < \nu_d < 35$$

the absolute value of the radius of curvature of the convergent lens located nearest the following divergent lens is within the range of one-half to double the absolute value of the focal distance $f_2$ of said movable group $$0.5|f_2| < |R| < 2|f_2|$$

the absolute value of the radius of curvature R nearest the object of the first divergent lens is comprised between the absolute value of the focal distance $f_2$ of said movable group and four times its absolute value $$|f_2| < |R| < 4|f_2|$$

5. A variable-focal-length objective according to claim 2, wherein:
   the second movable group comprises in sequence two divergent lenses and one convergent lens,
   the refractive index for the wavelength $\lambda = 588$ nm of the three lenses aforesaid is within the range of 1.60 to 1.85

$$1.60 < n_d < 1.85$$

and the Abbe number $\nu$ of the convergent lens is within the range of 20 to 35

$$20 < \nu_d < 35$$

the absolute value of the radius of curvature of the convergent lens located nearest the preceding divergent lens is within the range of one-half to double the absolute value of the focal distance $f_3$ of said movable group $$0.5|f_3| < |R| < 2|f_3|$$

the absolute value of the radius of curvature nearest the object of the first divergent lens is within the range of one-half to double the absolute value of the focal distance $f_3$ of said movable group $$0.5|f_3| < |R| < 2|f_3|$$

6. A variable-focal-length objective according to claim 2, wherein:
   the second movable group comprises in sequence one divergent lens, one convergent lens and one divergent lens;
   the refractive index for the wavelength $\lambda = 588$ nm of the three lenses aforesaid is within the range of 1.60 to 1.85

$$1.60 < n_d < 1.85$$

and the Abbe number $\nu$ of the convergent lens is within the range of 20 to 35

$$20 < \nu_d < 35$$

the absolute value of the radius of curvature of the convergent lens located nearest the following divergent lens is within the range of one-half to double the absolute value of the focal distance $f_3$ of said movable group $$0.5|f_3| < |R| < 2|f_3|$$

the absolute value of the radius of curvature nearest the object of the first divergent lens is within the range of one-half to double the absolute value of the focal distance $f_3$ of said movable group $$0.5|f_3| < |R| < 2|f_3|$$

7. A variable-focal-length objective according to claim 2, wherein the first convergent stationary group comprises in sequence two divergent lenses, one convergent lens, one cemented doublet constituted by a divergent lens and a convergent lens, and two convergent lenses:
   the absolute value of the radius of cementing of the doublet is within the range of one-half to three times the absolute value of the focal distance of said stationary group $$0.5|f_1| < |R| < 3|f_1|$$

the absolute value of the radius of curvature nearest the object of the first divergent lens is within the range of one-half to three times the absolute value of the focal distance of said stationary group $$0.5|f_1| < |R| < 3|f_1|$$

* * * * *